United States Patent [19]

Langhans et al.

[11] Patent Number: 4,823,939
[45] Date of Patent: Apr. 25, 1989

[54] CURVED PATH CHAIN CONVEYOR

[75] Inventors: Gerhard P. Langhans, Betzdorf; Jürgen Fett, Atzelgift; Karl G. Oelschläger, Hagen, all of Fed. Rep. of Germany

[73] Assignee: Rexnord Kette GmbH & Co KG, Betzdorf, Fed. Rep. of Germany

[21] Appl. No.: 212,064

[22] Filed: Jun. 27, 1988

Related U.S. Application Data

[63] Continuation of Ser. No. 853,456, Apr. 18, 1986, abandoned.

[30] Foreign Application Priority Data

Oct. 31, 1985 [DE] Fed. Rep. of Germany ... 8530825[U]

[51] Int. Cl.$^4$ .............................................. B65G 23/18
[52] U.S. Cl. ................... 198/805; 198/690.1
[58] Field of Search .............. 198/690.1, 805; 105/77; 238/15, 129, 148, 150

[56] References Cited

U.S. PATENT DOCUMENTS 4,643,298 2/1987 Wallaart ..................... 198/690.1 X
4,742,906 5/1988 Wallaart ........................... 198/805

FOREIGN PATENT DOCUMENTS 0049208 4/1982 European Pat. Off. ......... 198/690.1
2037690 12/1982 United Kingdom .............. 198/805

Primary Examiner—Robert J. Spar
Assistant Examiner—Lyle K. Kimms
Attorney, Agent, or Firm—Toren, McGeady & Associates

[57] ABSTRACT

A chain conveyor which moves along a curved path comprises a conveyor chain (1) formed of plate links (3), which are hinged to each other, and a track (2) on which the links (3) slide. The track (2) is made of plastics material in which a magnetic strip (6) is embedded. The strip (6) is made of magnetic powder bonded with plastics material and the remainder of the track (2) has ferromagnetic powder incorporated in it. The links (3) are ferromagnetic and thus a magnetic field passes through the track (2) and the link (3) to hold the conveyor chain (1) in contact with the track (2) especially where the track is curved. Where the track is curved the magnetic strip (6) is preferably at the outside of the curve.

2 Claims, 2 Drawing Sheets

CURVED PATH CHAIN CONVEYOR

This is a continuation of application Ser. No. 853,456, filed Apr. 18, 1986, abandoned.

This invention relates to a curved path chain conveyor comprising an articulated chain-like conveying band, a curved guide track and permanent magnet means holding the band in contact with the track.

Articulated chain-like bands generally consist of plate links, which are hinged together and are pivotally movable relative to one another about axes transverse to and perpendicular to the plane of the guide track. They are guided straight or around curves by the track, which may be of U-shaped cross-section. Since a force component which is directed towards the centre of the curve acts on the links at the curves, it frequently happens that the plate links are lifted off the track especially from that sliding surface of the guide track which is at the outside of the curve. This lifting may be counteracted by a construction disclosed in U.S. Pat. No. 3,529,715 in which the guide track has guide surfaces inclined to the vertical in a dovetail form. These surfaces co-operate with corresponding dovetail-shaped, downwardly extending lugs on the undersides of the plate links. In this manner keyed guidance is obtained, which prevents complete lifting off of the links in the curved parts of the track. This construction has, however, the disadvantage that the manufacture of the plate links and of the guide track is relatively expensive and the noise generated by the links sliding over the track is considerable. Added to this, considerable wear occurs in the curved parts of the track on the sliding surfaces, which slide on each other under appreciable pressure. What is more, with this construction, lifting-off of the plate links on the outside of the curve still cannot be completely prevented, because a certain clearance is necessary between the mutually facing guide surfaces of the plate links and of the guide track.

U.S. Pat. No. 3,804,232 discloses another chain conveyor in which the articulated band and the guide track are made of plastics material and are therefore extremely quiet in operation and moreover have favourable sliding properties. To prevent lifting off of the plate links in the curved parts of the track, these plate links and the guide track and some slight lifting-off of the plate links in curved parts of the track therefore cannot be avoided here also.

In order to keep the plate links continually in contact with the sliding surfaces of the guide tracks, a chain conveyor is disclosed in German Gebrauchsmuster Specification No. 78 18 570 which has plate links of ferromagnetic material and a U-shaped hollow guide track of metal, in which permanent magnets are mounted. The magnets attract the plate links onto the sliding surfaces of the track. Although the forces, which hold the plate links in contact with the guide track, achieved in this way have proved satisfactory, the cost of production is, however, considerable, because a large quantity of ferromagnetic material is necessary and the permanent magnets must be housed in the track and be fixed there. Added to this, in this chain conveyor, increased wear in curved parts of the track and considerable noise generation result.

The object of the present invention is to overcome or mitigate the aforementioned disadvantages and in particular to provide a chain conveyor which, with favourable manufacturing costs, can be operated with low noise and which under normal loading avoids lifting-off of the plate links from the track, especially in the region of curves and inclines.

The present invention is based on the concept of incorporating into an articulated chain-like band and/or the guide track made of plastics material a magnetic powder and optionally also, of incorporating a ferromagnetic powder into those parts of the plastics material which are free from magnetic powder.

In detail, the invention consists in that, in a curved path chain conveyor as initially described, the band and/or the track is of plastics material, and magnetic powder forming the magnet means is embedded in at least part of the plastics material, parts of the plastics material which are free of magnetic powder having ferromagnetic powder embedded in them.

In this way, the good sliding properties of the plastics materials suitable for the manufacture of chain conveyors are retained and an adequate holding force is obtained in the region of the magnetic powder, regardless of whether the plate links or the guide rail are of plastics material or of a ferromagnetic metal.

When the guide track is made of plastics material, as is preferred, the magnetic powder may be in a plastics strip which is embedded in a face of the guide track on which the band slides. Alternatively, the magnetic powder may be incorporated in a face of the track on which the band slides, or if the plate links of the band are of plastics material, the magnetic powder may be incorporated into sliding faces of the links.

If the plate links are of a ferromagnetic metal, for example mild steel or alloy steel, or are made at least partly of a plastics-bonded ferromagnetic material, then the guide track contains the magnetic powder. On the other hand, however, the guide track may consist at least partly of a plastics-bonded ferromagnetic material and then the plate links are made at least partly from a plastics material having magnetic powder incorporated in it.

In order to adjust the force holding the plate links on the track, to suit varying lifting-off forces, for instance when the guide trck and plate links of the band having sliding surfaces at the inside and at the outside of a curve in the track, the parts of the sliding surfaces of the track or the plate links have magnetic powder embedded in them and the width of the part in which the powder is embedded at the outside of the curve is greater than that of the part in which the powder is embedded at the inside of the curve and/or the concentration of the magnetic powder in the part at the outside of the curve is greater than it is in the part at the inside of the curve.

Some examples of conveyors in accordance with the invention will now be described with reference to the accompanying drawings in which.

Figure 1:
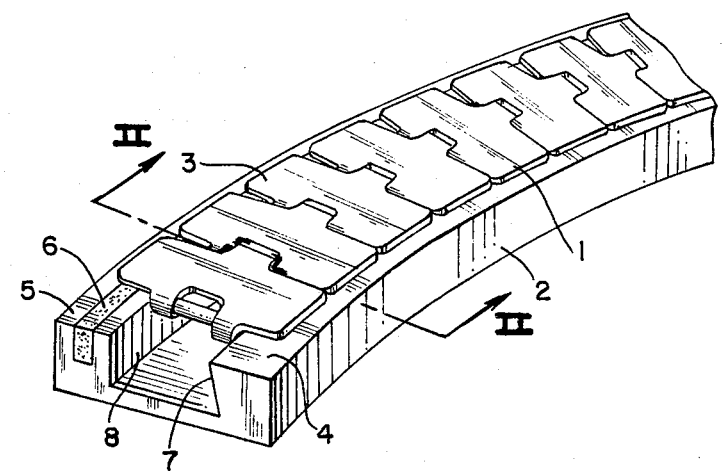
FIG. 1 is a perspective view of a portion of one example.

Each of the illustrated examples of the chain conveyor in accordance with the invention comprises an articulated chain-like band 1 and a guide track 2, which is approximately U-shaped in cross-section. The band 1 is composed of plate links 3, hinged together to enable them to pivot relative to each other in two directions, that is horizontally and vertically as seen in FIG. 1. The undersides of the links 3 form sliding surfaces which slide over sliding surfaces 4, 5 of the guide track 2.

In the sliding surface 5 situated at the outside of a curve of the guide track 2, a magnetised strip 6 is located. This is for example a flexible magnetic strip of plastics-bonded magnetic powder. The magnetic strip 6 holds the plate links 3, which are of ferromagnetic metal, in the region of the outside of the curve in close contact with the sliding surface 5, so that it counteracts lifting-off of the plate links.

In order to improve the guidance of the band, the guide track 2 has, in cross-section, an internal shape having guide surfaces 7, 8, one undercut and inclined to the vertical and one vertical. Arms 9, 10, which are inclined correspondingly to the guide surface 7, of guide stirrups 11, which are fixed on the undersides of the plate links 3, are disposed adjacent or in contact with the surfaces 7, 8.

Figure 3:
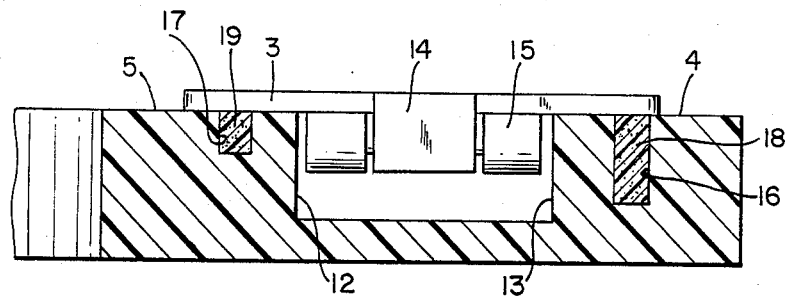
FIG. 3 is a cross-section, similar to the section of FIG. 2, but of a second example.

In the example of FIG. 3, guide surfaces 12, 13 are oriented vertically, and adjacent to them are situated end faces of hinge pins 15, which pass through plate eyes 14 at mutually facing edges of the plate links 3. The guide track has, in its sliding surfaces 4, 5, slits 16, 17, in which magnetised strips 18, 19, of plastics-bonded magnetic powder, are disposed with a tight fit. The magnetic strip 18, which is situated at the outside of a curve in the track, is deeper than the internally situated magnetic strip 19.

Figure 2:
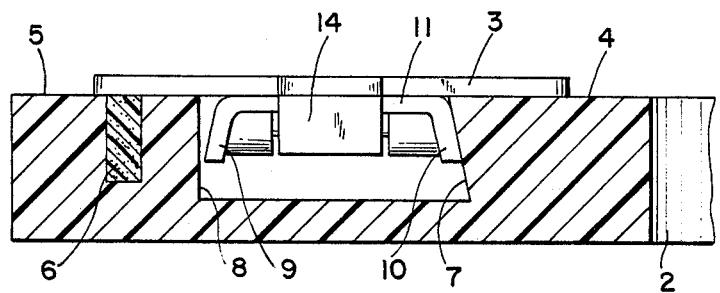
FIG. 2 is a cross-section as seen in the direction of the arrows on the line II—II in FIG. 1.
Figure 4:
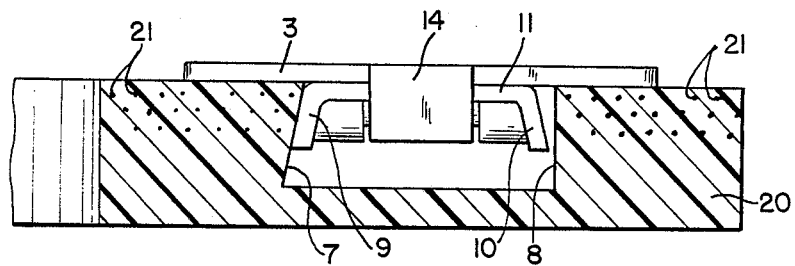
FIG. 4 is a cross-section similar to Figure 2, but of a third example.

In the example of FIG. 4, the band corresponds to the example of FIGS. 1 and 2, whereas the guide track 20 is of a plastics material with magnetic powder particles 21 embedded in it in the region of the sliding surfaces 4, 5.

Figure 5:
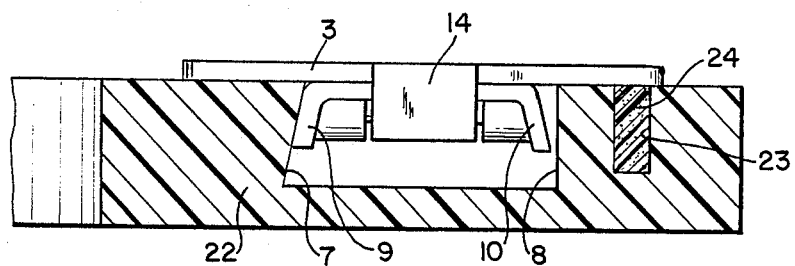
FIG. 5 is a cross-section, similar to Figure 2, but of a fourth example.

In the example of FIG. 5, the band also corresponds to that of the example of FIGS. 1 and 2, and the guide rail 22 is of plastics materials. It has, only on the outside of a bend, a groove 23, in which a magnetic strip 24, preferably of plastics-bonded magnetic powder, is situated with a tight fit. In this manner, with this example, a magnetic force holding the links in contact with the track is generated only on the outside of the curve.

Regardless of whether the materials of the band and track are of metal on the one hand and plastics material with magnetic powder in it or of plastics material with ferromagnetic powder incorporated in it and plastics material with magnetic powder incorporated in it on the other hand, in all cases a sufficient holding force, which may be determined in dependence upon the lifting-off force, is obtained. This force, even without a form-fitting or keyed guidance between the articulated band and the guide rail, assures reliable guidance and prevents lifting-off of the plate links in the region of curves and inclines of the track. For this purpose, plate links of plastics material, regardless of whether they contain ferromagnetic powder or a magnetic, that is magnetised, powder, can be made by injection moulding, while a guide track of plastics material with or without incorporated powder particles can be manufactured in a simple manner by extrusion.

We claim:

1. A curved path chain conveyor, comprising an articulated chain-like conveying band, a guide track, the guide track defining two spaced-apart sliding surfaces, the conveying band slidably mounted on the sliding surfaces, the conveying band made of ferro-magnetic material and the guide track made of plastics material, at least one of the sliding surfaces defining a longitudinally extending groove, the groove having an opening contiguous with the sliding surface, a flexible strip of plastics material, a permanent magnet in the form of magnetic powder being embedded in the plastics material of the flexible strip, the flexible strip being received in the groove.

2. A conveyor as claimed in claim 1, in which said band includes plate links and means hingedly connecting said plate links to each other.

* * * * *